United States Patent
Rieger

(10) Patent No.: US 8,271,034 B2
(45) Date of Patent: *Sep. 18, 2012

(54) SYSTEM AND METHOD FOR ESTABLISHING AND ENFORCING SERVICE RULES IN A SERVICE PROVIDER NETWORK

(75) Inventor: Remi Rieger, Charlotte, NC (US)

(73) Assignee: Time Warner Cable, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/079,994

(22) Filed: Apr. 5, 2011

(65) Prior Publication Data
US 2011/0185045 A1    Jul. 28, 2011

Related U.S. Application Data

(63) Continuation of application No. 11/500,246, filed on Aug. 7, 2006, now Pat. No. 7,965,703.

(51) Int. Cl.
*H04M 1/00* (2006.01)
*H04N 7/173* (2011.01)

(52) U.S. Cl. .................. 455/556.1; 725/95

(58) Field of Classification Search .......... 725/95, 725/133, 114, 27, 39; 370/352, 468; 380/255; 707/3
See application file for complete search history.

(56) References Cited

U.S. PATENT DOCUMENTS

| 2005/0149501 | A1* | 7/2005 | Barrett ................ 707/3 |
| 2005/0152551 | A1* | 7/2005 | Defreese et al. ........ 380/255 |
| 2007/0143804 | A1* | 6/2007 | Wang ................ 725/95 |

* cited by examiner

*Primary Examiner* — Kiet Doan
(74) *Attorney, Agent, or Firm* — The Marbury Law Group, PLLC

(57) ABSTRACT

A system and method for establishing a rule for an end device connected to a subscriber network. The subscriber network is connected to a service provider network via a local gateway. The subscriber network receives services from a remote operations center via a service provider network. Capability information indicative of a service that the end device is capable of receiving is acquired by the local gateway from the end device. The capability information is sent to the remote operations center via the service provider network. The remote operations center uses the capability information to identify a subscriber service that is supported by the end device. The remote operations center uses the capability information to determine if the end device requires an application to provide a service and, if so, provides the application to the end device.

20 Claims, 2 Drawing Sheets

SYSTEM AND METHOD FOR ESTABLISHING AND ENFORCING SERVICE RULES IN A SERVICE PROVIDER NETWORK

BACKGROUND

Embodiments of the present invention relate to providing services to a subscriber via a subscriber network, and more particularly to a system and a method for establishing rules for devices connected to a subscriber network that are receiving services from a service provider network.

High speed broadband networks deliver connectivity to a variety of terminal devices that provide an increasingly broad range of services. A broadband network may, for example, carry television programming, audio programming, gaming services, video streaming services, on-demand services, digital telephone services, and Internet services. These services may be delivered to a set top terminal, a computer, or a personal media device, to name few.

From the subscriber's perspective, this connectivity is a double edged sword. While new and better services are appreciated, the increasing complexity of home networks is not. Various standards groups have been formed to develop interoperability standards that dictate how disparate devices may communicate over a network. The most notable of these standards are HAVi (Home Audio Video interoperability; specification available from www.havi.org) and UPnP (Universal Plug and Play; specification available from www.upnp.org).

HAVi was created as a common software architecture for audiovisual devices operating over IEEE 1394. HAVi systems provide a generic messaging system for communication between software modules. The location of the communication peer is transparent to the application. HAVi allows a device to subscribe to a service and defines an "event" relative to a change in that service.

UPnP is a protocol specification, enhancing the standard IP stack, and is as such network independent. For the transport of audiovisual content UPnP relies on well known Internet standards such as HTTP or RTP. The interoperability standards such as HAVi and UPnP are generally directed to providing user control over multiple devices within a network.

From the service provider's perspective, connectivity offers both increased opportunities for new revenue streams and increased demands on subscriber support resources. End devices have varying capabilities. Further, not all end devices will be connected to a subscriber network at any one time. Because the architecture of a subscriber network is largely unknown to a service provider, it is difficult for a service provider to know precisely what services to offer a subscriber.

A service comprises both content elements and network configuration elements. For example, an email service requires less bandwidth and lower priority than a voice over IP (VoIP) service. The quality of service (QoS) level associated with a particular service can also be dependent on the capabilities of the device to which the service is being delivered. Thus, an HD video stream may be appropriate for a media computer, but may not be appropriate for a personal media device.

In a cable network, a quality of service (QoS) level is defined for communications between a CM and a CMTS for each service to which a subscriber subscribes. For example, a basic data service subscriber may receive downstream traffic at a maximum burst rate of 3 Mbps, while a premium subscriber may receive downstream traffic at maximum burst rate of 6 Mbps. Voice over IP (VoIP) services are typically provided with very stringent QoS requirements to assure that the quality of a cable-delivered telephone call will equal or exceed the call quality of a call placed over the public switched telephone network.

The principal mechanism for providing enhanced QoS is to classify packets traversing a path between a CM and CMTS into a service flow. A service flow is a unidirectional flow of packets that is provided a particular Quality of Service. The CM and CMTS provide this QoS by shaping, policing, and prioritizing traffic according to a QoS parameter set defined for the service flow. Service flows exist in both the upstream and downstream direction, and may exist without actually being activated to carry traffic. Service flows have a 32-bit service flow identifier (SFID) assigned by the CMTS. All service flows have an SFID. An active and admitted upstream service flow also has a 14-bit Service Identifier (SID). At least two service flows are defined in a configuration file received by a CM—one for upstream and one for downstream service. The first upstream service flow describes the primary upstream service flow, and is the default service flow used for otherwise unclassified traffic. The first downstream service flow describes service to the primary downstream service flow. Additional service flows defined in the configuration file create service flows that are provided QoS services.

Conceptually, incoming packets are matched to a classifier that determines to which QoS service flow the packet is forwarded. The header of the packet is examined. If the packet matches one of the classifiers, it is forwarded to the service flow indicated by the SFID attribute of the classifier. If the packet is not matched to a classifier, it is forwarded on the primary service flow.

A classifier is a set of matching criteria applied to each packet entering the cable network. It comprises some packet matching criteria (destination IP address, for example), a classifier priority, and a reference to a service flow. If a packet matches the specified packet matching criteria, it is then delivered on the referenced service flow. Several classifiers may all refer to the same service flow. The classifier priority is used for ordering the application of classifiers to packets. Explicit ordering is necessary because the patterns used by classifiers may overlap. Downstream classifiers are applied by the CMTS to packets it is transmitting, and upstream classifiers are applied at the CM and may be applied at the CMTS to police the classification of upstream packets. The characteristics of a provisioned downstream service flow are defined in a DOCSIS configuration file downloaded by the CM when it boots and provided to the CMTS by the CM during registration.

Multiple service flows can be assigned per cable modem in either the upstream or downstream direction, and each of these service flows can correspond to a different QoS parameter set with different characteristics. This is conducive to allowing the CM to accommodate multiple kinds of data traffic at once, such as standard Internet traffic and Voice over IP (VoIP).

To guarantee bandwidth for a specific service, a network device must be able to identify packets associated with that service in all the IP traffic flowing through it. This identification and grouping process is called packet classification. Media gateways and MTAs use various match criteria to place traffic into a certain number of classes. Packet marking is the process of setting a Type of Service (ToS) bits or Differentiated Service Code Point (DSCP) bits in the IP header.

Ideally, a service provider would offer services to a subscriber consistent with the subscriber's network architecture and consistent with a level of service for which the subscriber has paid an appropriate fee. What would be useful would be a system that could determine a subscriber's network architecture, determine the capabilities of end devices registered with the subscriber network, determine the services which a subscriber is entitled to receive, and establish rules for the delivery of services to appropriate end devices.

SUMMARY

In an embodiment of the present invention, a subscriber receives services from a remote operations center over a service provider network. The service provider network terminates at the subscriber location in a gateway comprising a local device manager (LDM), a local rule manager (LRM) and a local application manager (LAM). An end device is connected to the local gateway via a subscriber local area network (LAN) that may be wired or wireless. In an embodiment of the present invention, the service provider network is a broadband network and the remote operations center is a head-end. However, this is not meant as a limitation.

The LDM receives information indicative of the capabilities of the end device. In an embodiment of the present invention, the capability information is reported to the LDM by the end device. By way of illustration and not as a limitation, the LDM and the end device are compliant with the UPnP protocol. The capability information is reported to the LDM in accordance with UPnP procedures. In an alternate embodiment, the capability information of an end device is acquired through a user interface that receives and accepts input from a subscriber via an input device. The LDM stores the capability information in association with the end device and sends the capability information to the remote operations center over the service provider network.

The remote operations center comprises a remote device manager (RDM), a remote rule manager (RRM) and a remote application server (RAS). The RDM receives the capability information of the end device and stores the information in a datastore. The RDM uses the capability information to determine the services that are offered by the remote operations center that are suitable for the end device.

The RRM uses subscriber identifying information to interact with a subscriber datastore to determine the services that are available to the subscriber based on the subscription agreement between the subscriber and the service provider. As a result of this interaction between the RRM and the subscriber datastore, two classes of service can be identified. A first class of service comprises services determined to be suitable for the end device and which the subscriber is already entitled to receive. A second class of service comprises services determined to be suitable for the end device but which require a change in the subscription of the subscriber, either because an additional fee is required to receive the service or because the service requires additional resources from the subscriber network.

As to services determined to be suitable for the end device and which the subscriber is already entitled to receive, the RRM establishes rules that determine the services that the subscriber is entitled to receive on the end device and reports those rules to the LRM residing on the local gateway for enforcement. By way of illustration and not as a limitation, the LRM may determine which end devices may receive a service, the number of devices that may receive a service simultaneously, a time when the service may be available, a preset session limit that governs the number of sessions allowed over a period of time, and the service flow assigned to the service.

A service that is suitable for the end device may require an application in order for the service to be delivered to the end device. The RAS identifies applications, if any, required for a particular service. The RAS may run an instance of the required application or may provide the application to the LAM. The LAM may execute or provide the application to the end device for execution.

As to services determined to be suitable for the end device but which require a change in the subscription of the subscriber, either because an additional fee is required to receive the service or because the service requires additional resources from the subscriber network, the RRM provides the subscriber a notification message that provides the subscriber the option of changing the subscriber's subscription.

It is therefore an aspect of the present invention to determine the services available to a subscriber that are suitable for end devices connected to a subscriber network.

It is another aspect of the present invention to provide services to a subscriber commensurate with the capabilities of end devices connected to a subscriber LAN based on a level of service for which the subscriber pays a fee.

It is yet another aspect of the present invention to offer to upgrade a subscriber's subscription so as to allow the subscriber to receive services commensurate with the capabilities of end devices connected to a subscriber LAN.

It is still another aspect of the present invention to establish rules relating to a service at a remote operations center operated by a service provider and to enforce those rules at the subscriber LAN.

These and other aspects of the present invention will be apparent from the general and detailed disclosures that follow.

In an embodiment of the present invention, a system for establishing a rule for an end device comprises a subscriber network, an end device, a subscriber datastore, and a remote operations center. By way of illustration and not as a limitation, the subscriber network may be a wired or wireless network, the service provider network may be a cable network and the remote operations center may be a headend.

The subscriber network receives services via a service provider network operated by a service provider. The subscriber network is associated with a subscriber by subscriber identifying information. The end device is connected to the subscriber network and comprises capability information. By way of illustration and not as a limitation, the end device may be a computer, a personal digital assistant, a personal media assistant, a digital telephone, and a set top terminal. The subscriber datastore comprises subscriber service information associated with the subscriber identifying information.

The remote operations center receives subscriber identifying information and the end device capability information from the subscriber network. The remote operations center accesses the subscriber datastore to determine from the subscriber identifying information services that the subscriber is entitled to receive over the service provider network (herein, "the subscriber services"). Using the capability information, the remote operations center identifies a subscriber service that is supported by the end device (herein, "the supported subscriber service") and establishes a rule set to govern use of the supported subscriber service by the end device.

In another embodiment of the present invention, the system further comprises a local gateway. In this embodiment, the remote operations center sends the rule set to the local gateway via the service provider network. The local gateway enforces the rule set so as to permit the end device to use the supported subscriber service in accordance with the rule set. By way of illustration and not as a limitation, the supported subscriber services may be a service for video streaming, video downloading, music streaming, music downloading, voice over IP, picture sharing, application sharing, video conferencing, video books and electronic print distribution, movie and program libraries distribution, online gaming, alerting services, and advanced remote device support. By way of illustration and not as a limitation, a rule set may comprise one or more of a quality of service rule, a digital rights rule, a music rule, a video rule, a voice rule, an application rule, a time-of-day rule, a metered usage rule, a priority rule, and an authorization rule.

In an embodiment of the present invention, the remote operations center determines whether use of the supported subscriber service by the end device requires an application to be operated at the remote operations center and, if so, operates the application at the remote operations center.

In yet another embodiment of the present invention, the remote operations center determines whether use of the supported subscriber service by the end device requires an application to be operated by the local gateway and sends the application to the local gateway via the service provider network if the application is required. In this embodiment, the local gateway is further adapted for receiving the application and operating the application.

In even another embodiment of the present invention, the remote operations center determines whether use of the supported subscriber service by the end device requires an application to be operated by the end device. If the application is required, the remote operations center sends the application to the local gateway via the service provider network. In this embodiment, the local gateway receives the application and sends the application to the end device. The end device then operates the application.

In a further embodiment of the present invention, the remote operation center uses the capability information to identify services offered by the service provider that are supported by the end device (herein, "the offered supported service") and uses the subscriber identifying information to identify an offered supported service that the subscriber is not entitled to receive, and notifying the subscriber of how to become authorized to receive the offered supported service that the subscriber is not entitled to receive.

DETAILED DESCRIPTION

In an embodiment of the present invention, a local gateway comprises a local rule manager (LRM) and a local application manager (LAM). An end device is connected to the local gateway via a local area network (LAN) that may be wired or wireless. The local gateway also connects the LAN to a remote operations center via an external network. The remote operations center comprises a remote rule manager (RRM) and a remote application server (RAS). The RAS operates network-based applications that the local gateway and/or an end device may use. Use of a network-based application by an end device is determined by rules established for the end device by the RRM and enforced by the LRM.

Figure 1:
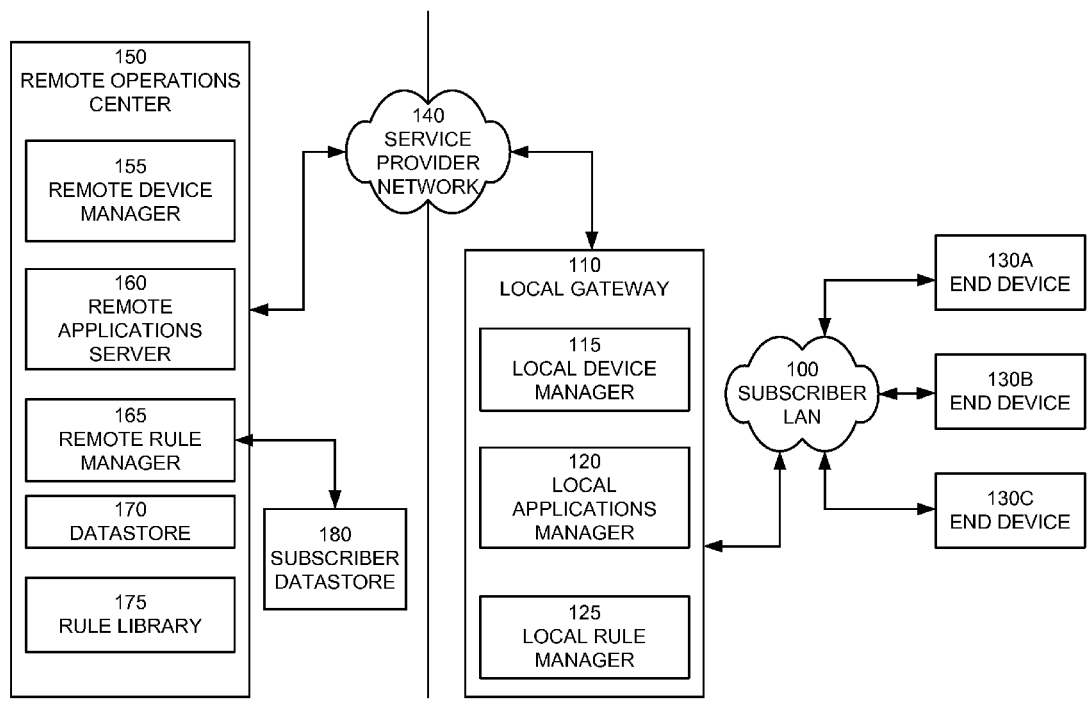
FIG. 1 illustrates a block diagram of a system for providing rules to an end device according to an embodiment of the present invention.

FIG. 1 illustrates a block diagram of a system for providing rules to an end device according to an embodiment of the present invention. Subscriber LAN 100 connects gateway 110 to end device 130A, end device 130B, and end device 130C. Gateway 110 connects subscriber LAN 100 to service provider network 140. Service provider network 140 connects remote operations center 150 to gateway 110. The subscriber network is associated with a subscriber by subscriber identifying information Gateway 110 comprises local device manager (LDM) 115, local applications manager 120, and local rule manager 125 (LRM). LDM 115 receives information indicative of the capabilities of an end device (130A-C). In an embodiment of the present invention, the capability information is reported to the LDM 115 by the end device, as for example end device 130A. By way of illustration and not as a limitation, the LDM 115 and the end device 130A are compliant with the UPnP protocol. The capability information is reported to the LDM 115 in accordance with UPnP procedures. In an alternate embodiment, the capability information of end device 130A is acquired through a user interface that receives and accepts input from a subscriber via an input device (not illustrated but well known in the art). The LDM 115 stores the capability information in association with the end device 130A and sends the capability information and subscriber identifying information to the remote operations center 150 over the service provider network 140.

The remote operations center comprises a remote device manager (RDM) 155, a remote rule manager (RRM) 165 and a remote application server (RAS) 160. The RDM 155 receives subscriber identifying information and the capability information of the end device (130A-C) and stores the information in a datastore 170. The RDM 155 uses the capability information to determine the services that are supported by the end device. The RDM 155 reports these supported subscriber services to the RRM 165.

The RRM 165 uses the subscriber identifying information to interact with a subscriber datastore 180 to determine the services that are available to the subscriber based on the subscription agreement between the subscriber and the service provider. In an embodiment of the present invention, the subscriber datastore 180 comprises a subscriber billing system. As a result of this interaction between the RRM 165 and the subscriber datastore, two classes of service can be identified.

A first class of service comprises services determined to be suitable for each end device (130A-C) and which the subscriber is currently entitled to receive. By way of illustration and not as a limitation, subscriber services may comprise video streaming, video downloading, music streaming, music downloading, voice over IP, picture sharing, application sharing, video conferencing, video books and electronic print distribution, movie and program libraries distribution, online gaming, alerting services, and advanced remote device support.

A second class of service comprises additional services determined to be suitable for the end device but which require a change in the subscription of the subscriber, either because an additional fee is required to receive the service or because the service requires additional resources from the service provider network 140.

As to the first class of services (services determined to be suitable for the end device (130A-C) and which the subscriber is already entitled to receive), the RRM 165 establishes rules that determine the services that the subscriber is entitled to receive on the end devices (130A-C) and reports those rules to the LRM 125 residing on the local gateway 110 for enforcement. By way of illustration and not as a limitation, the LRM 125 may enforce rules that establish which end devices (130A-C) may receive a service, the number of devices that may receive a service simultaneously, a time when the service may be available, a preset session limit that governs the number of sessions allowed over a period of time, and the service flow assigned to the service.

Based on the foregoing, in this embodiment of the present invention, the remote operations center is adapted for receiving the subscriber identifying information and the end device capability information from the subscriber network, accessing the subscriber datastore to determine from the subscriber identifying information services that the subscriber is entitled to receive over the service provider network, using the capability information to identify a subscriber service that is supported by the end device, and establishing a rule set to govern use of the supported subscriber service by the end device. Further, the remote operations center is adapted for sending the rule set to local gateway and the local gateway is adapted for enforcing the rule set so as to permit the end device to use the supported subscriber service in accordance with the rule set.

A service that is suitable for an end device (130A-C) may require an application in order for the service to be delivered to the end device. The RAS 160 identifies applications, if any, required for a particular service. The RAS 160 may run an instance of the required application or may provide the application to the LAM 120. The LAM 120 may execute the application or provide the application to an end device (130A-C) for execution. The LAM 120 also manages data exchanges between an end device (130A-C), an application, and RAS 160. Based on the foregoing, in this embodiment of the present invention, the remote operations center is adapted for determining whether use of the supported subscriber service by the end device requires an application to be operated at the remote operations center and operating the application at the remote operations center if the application is required. In an alternative embodiment of the present invention, the remote operations center is adapted for sending the application to the local gateway and the local gateway is adapted for receiving and operating the application. In yet another embodiment of the present invention, the remote operations center is adapted for sending the application to the end device and the end device is adapted for receiving and operating the application.

As to the second class of services (a service that is suitable for an end device (FIG. 1, 130A-C) but would require a change in the subscription of the subscriber, either because an additional fee is required to receive the service or because the service requires additional resources from the subscriber network), the RRM 165 sends the subscriber a notification message that provides the subscriber the option of changing the subscriber's subscription. If the offer to change the subscription is rejected, the second class of services is not provided to the subscriber. The rules reported to the LRM 125 would thus comprise rules that enable services within the first class of services and preclude access to services within the second class of services. Based on the foregoing, in this embodiment of the present invention, the remote operations center is adapted for using the capability information to identify services offered by the service provider that are supported by the end device, using the subscriber identifying information to identify an offered supported service that the subscriber is not entitled to receive, and notifying the subscriber of how to become authorized to receive the offered supported service that the subscriber is not entitled to receive.

In an embodiment of the present invention, the RRM 165 interacts with a subscriber datastore 180 to obtain a service bundle identifier that is associated with a service bundle that describes the services that the subscriber is authorized to receive. In this embodiment, the bundle level identifier is also associated with a rule set held in rule library 175. The capability information of the end devices (130A-C) is checked against the service bundle description to determine whether the architecture of subscriber LAN 100 so as require a change in the service bundle assigned to the subscriber. The reassignment of a subscriber to a new service bundle may be transparent to the subscriber or may require the subscriber to pay an additional subscription fee. If the service bundle identifier is changed, RRM 165 interacts with rule library 175 to determine the rule set associated with the new service bundle identifier. This rule set is then communicated to LRM 125.

As previously described, an application may be required to provide a service to a subscriber. An application may be executed on the RAS 160, on the LDM 115, or on a particular end device (130A-C). As will be appreciated by those skilled in the art, an application may comprise modules that are executed on any combination of those logical components without departing from the scope of the present invention. RAS 160 manages the need for applications based on information received from RDM 155 and manages the distribution of applications to the extent required by LAM 120 and/or an end device (130A-C).

Figure 2:
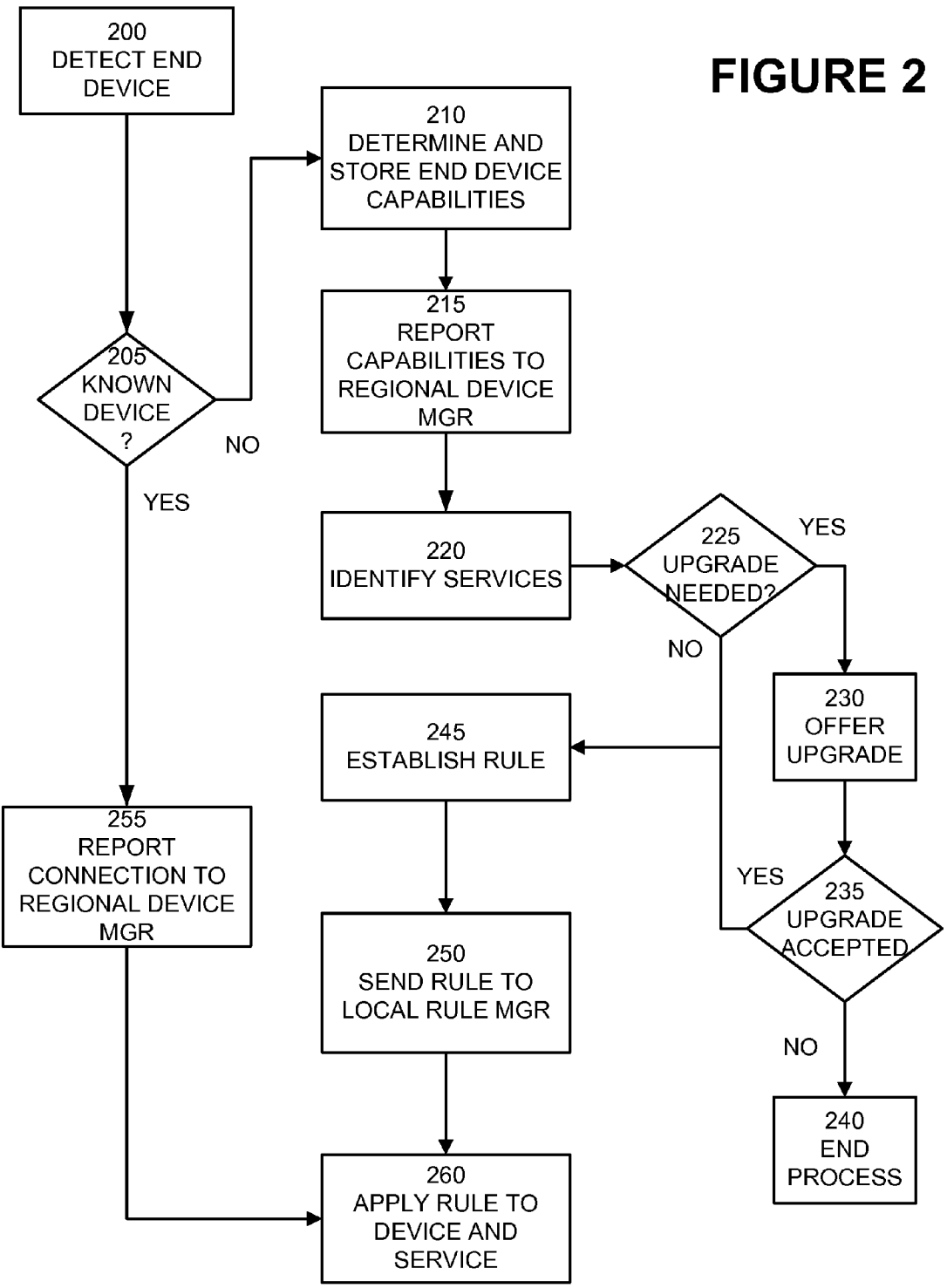
FIG. 2 illustrates a process for establishing rules for an end device according to an embodiment of the present invention.

FIG. 2 illustrates a process for establishing rules for an end device according to an embodiment of the present invention.

Referring to FIGS. 1 and 2, an end device (130A-C) is detected 200 on the subscriber LAN (FIG. 1, 100). The detection process may occur each time an end device is connected to the subscriber LAN, each time the local gateway (FIG. 1, 110) is rebooted, or periodically as determined by the operator of the remote operations center (FIG. 1, 150). A determination is made whether an end device is a known device 205.

In an embodiment of the present invention, the first time an end device is connected to the subscriber network, the capabilities of the end device are determined and the capabilities of the device and a device identifier are stored 210 in a local device manager (FIG. 1, 115). In an embodiment of the present invention, the device identifier comprises the MAC address of the end device.

A determination is made whether an end device is a known device 205. In an embodiment of the present invention, this determination is made by acquiring the device identifier and determining whether the device identifier is stored in the LDM (FIG. 1, 115).

If the device is known, the connection of the device to the subscriber LAN is reported to the RDM (FIG. 1, 155) 255. Referring to FIG. 1, the RDM 155 uses the capability information to determine the services offered by the service provider that are supported by the end device. The RDM 155 reports these supported subscriber services to the RRM 165 and to the RAS 160. The RAS 160 coordinates the loading of any applications required for the end device to access the services which the subscriber is authorized to receive on that end device. In an embodiment of the present invention, if the end device is capable of accessing services that the subscriber is not currently authorized to receive, the RDM 165 periodically notifies the subscriber of the opportunity to upgrade the subscriber's service commitment.

The rules applicable to a known device are determined and enforced 260.

If the device is not known, the capabilities of the end device are determined and the capabilities of the device and a device identifier are stored 210 in a local device manager (FIG. 1, 115). The capabilities of the end device are reported to the RDM (FIG. 1, 155). The RDM 155 uses the capability information to determine the services that are offered by the remote operations center that are suitable for the end device 220.

In an embodiment of the present invention, a remote rule manager (RRM) (FIG. 1, 165) interacts with a subscriber datastore (not illustrated) to determine the services that are available to the subscriber based on the subscription agreement between the subscriber and the service provider. In an embodiment of the present invention, the subscriber datastore 180 comprises a subscriber billing system. As a result of this interaction between the RRM 165 and the subscriber datastore, two classes of service can be identified.

A first class of service comprises services determined to be suitable for each end device (FIG. 1, 130A-C) and which the subscriber is currently entitled to receive.

A second class of service comprises services determined to be suitable for the end device but which require a change in the subscription of the subscriber, either because an additional fee is required to receive the service or because the service requires additional resources from the service provider network (FIG. 1, 140).

As to the first class of services (services determined to be suitable for the end device (130A-C) and which the subscriber is already entitled to receive), the RRM 165 establishes rules that determine the services that the subscriber is entitled to receive on the end devices (130A-C) 245 and reports those rules 250 to the LRM (FIG. 1, 125) residing on the local gateway (FIG. 1, 110) for enforcement 260.

As to the second class of services (a service that is suitable for an end device (FIG. 1, 130A-C) but would require a change in the subscription of the subscriber, either because an additional fee is required to receive the service or because the service requires additional resources from the subscriber network), a notification message is sent to the subscriber offering a service upgrade 230. If the offer to upgrade is rejected, the process with respect to the second class of services is terminated 240.

Tables 1 and 2 illustrate exemplary rule definition tables according to embodiments of the present invention. The rule references QoS levels and application classes that are appropriate for a particular device.

Table 1 illustrates a rule definition table for a portable media player.

TABLE 1

| Rule Table for a Portable Media Player | |
| --- | --- |
| Device Capabilities: | 2 Gbyte flash storage, Wireless connectivity, No Digital Right capability, UPnP capable, MPEG 2 Video playbackcapable, MP3 Music capable; 450 MIPS Processor, 64 Mbps RAM; Voice not capable. |
| Digital Rights Rule: | No access to protected content. |
| Video Rule: | Streaming access, small movie clip storage only, MPEG 2 file type only. No IPTV access. No download access. |
| Music Rule | Streaming access, download access, upload capable. |
| QOS Rule: | Level 3 for Video Access; Level 5 Music, Level 10 for all other services. |
| Voice Rule | None. |
| Application Rule: | Class 3 type apps or lower only |
| Services Available: | Video streaming; music streaming; movie clip downloading; music downloading; application downloading (class 3 or lower); Online Gaming. |
| Service Subscribed: | Video Streaming; Online Gaming. |

Table 2 illustrates a rule definition table for a smart phone.

TABLE 2

| Rule Table for a Smart Phone | |
| --- | --- |
| Device Capabilities | SIP VOIP, 802.11n, Cellular, digital rights capable, MPEG 4 video playback, no music playback, 350 MIPS processor, 64 Mbps RAM, 64 Mbps Flash memory. |
| Digital Rights Rule: | Access to protected content. |
| Video Rule: | Streaming access only, MPEG4 file format. |
| Music Rule | No Access. |
| QOS Rule: | Level 1 for VOIP services, all others Level 3. |
| Voice Rule: | VOIP Access, Long distance, International, Cellular, Video conferencing. |
| Services Available: | In-home phone services, Mobile phone services; Video streaming; Video conferencing application downloading (class 5 or lower); Online Gaming; Electronic books, print access. |
| Services Subscribed: | In-home phone services. |

In another embodiment of the present invention, a local rule manager exercises preemptive control over services provided to a subscriber LAN.

Referring again to FIG. 1, LDM 115 receives information indicative of the capabilities of subscriber LAN 100. Gateway 110 monitors the services that are provided to end devices (130A-C) connected to subscriber LAN 100. By way of illustration, gateway 110 determines that end device 130A is a computer receiving streaming high definition video, end device 130B is a VoIP communication device that is idle, and end device 130C is a web camera providing video imaging over an instant messaging connection. If a VoIP call is received, end device (VoIP communication device) 130B will require resources from the subscriber LAN 100. A problem arises when the resources of subscriber LAN 100 are insufficient to support the services requested by the end devices (130A-C) connected to it.

In an embodiment of the present invention, LRM 125 comprises a priority schedule that allows LRM 125 to exercise preemptive control over lower priority services to assure that higher priority services are delivered at a preset QoS level. In the example given above, assuming the VoIP call has the highest priority, the LRM 125 would take steps to ensure that the VoIP call is received at its QoS level. The steps comprise the termination of a service (preemption), the downgrading of a service, and the suspension of a service coupled with caching to allow the service to resume when the priority service terminates. In the example given above, the HD video stream could be downgraded to an SD signal, the HD video stream could be cached (recorded), and the video imaging transmission could be terminated.

While the services described above may be categorized as "downstream services," the present invention is not so limited. Rules may also be established for upstream services. By way of illustration and not as a limitation, a service provider may offer a gaming service, a file storage service, and a device monitoring service. These services require that data be sent upstream in accordance with rules determined by the end devices connected to the subscriber's LAN and by the level of service that the subscriber is currently entitled to receive.

A system and method for establishing and enforcing service rules in a service provider network has been described. The present invention has been described in terms of preferred embodiments. It will be understood by those skilled in the art that the present invention may be embodied in other specific forms without departing from the scope of the invention disclosed and that the examples and embodiments described herein are in all respects illustrative and not restrictive. Those skilled in the art of the present invention will recognize that other embodiments using the concepts described herein are also possible. Further, any reference to claim elements in the singular, for example, using the articles "a," "an," or "the," is not to be construed as limiting the element to the singular.

What is claimed is:

1. A system for establishing a rule for an end device from a remote operations center comprising:
   an end device, wherein the end device is connected to the local gateway via a subscriber network, wherein the end device comprises capability information, wherein the capability information is indicative of whether the end device is capable of performing the functions required to utilize a service provided by the service provider, and wherein the end device is configured to provide the capability information to the local gateway; and
   a datastore accessible to a remote operations center, wherein the datastore receives the capability information from the local gateway,
   wherein the remote operations center is configured for:
      accessing the datastore;
      relating the capability information of the end-device to services provided by the service provider to identify a subscriber service provided by the service provider for which the end device is functionally capable of performing (the supported subscriber service);
      determining from the capability information whether use of the supported subscriber service by the end device requires an application to be operated by the end device; and
      sending the application to the end device via the service provider network when the application is required, and
   wherein the end device is further configured for:
      receiving the application; and
      operating the application.

2. The system of claim 1, wherein the remote operations center is further configured for establishing a rule set to govern use of the supported subscriber service by the end device.

3. The system of claim 2, wherein the remote operations center is further configured for sending the rule set to the local gateway via the service provider network, and wherein the local gateway is configured for enforcing the rule set so as to permit the end device to use the supported subscriber service in accordance with the rule set.

4. The system of claim 1, wherein the service provider network is a cable network and the remote operations center is a headend.

5. The system of claim 1, wherein the subscriber network is selected from the group consisting of a wired network and a wireless network.

6. The system of claim 1, wherein the end device is selected from the group consisting of a computer, a personal digital assistant, a personal media assistant, a digital telephone and a set top terminal.

7. The system of claim 1, wherein the supported subscriber services are selected from the group consisting of video streaming, video downloading, music streaming, music downloading, voice over IP, picture sharing, application sharing, video conferencing, video books and electronic print distribution, movie and program libraries distribution, online gaming, alerting services, and advanced remote device support.

8. The system of claim 1, wherein the rule set comprises one or more rules selected from the group consisting of a quality of service rule, a digital rights rule, a music rule, a video rule, a voice rule, an application rule, a time-of-day rule, a metered usage rule, a priority rule, and an authorization rule.

9. The system of claim 1, wherein the remote operations center is further configured for:
   determining from the capability information whether use of the supported subscriber service by the end device requires an application to be operated at the remote operations center; and
   operating the application at the remote operations center when the application is required.

10. A method for establishing a rule for an end device from a remote operations center comprising:
    providing from an end device capability information to a local gateway, wherein the capability information is indicative of whether the end device is capable of performing the functions required to utilize a service provided by the service provider;
    receiving at a datastore the capability information from the local gateway via a service provider network, wherein the datastore is accessible to a remote operations center;
    accessing at the remote operations center the datastore;
    using at the remote operations center the capability information to identify a subscriber service provided by the service provider for which the end device is functionally capable of performing (the supported subscriber service);
    determining at the remote operation center from the capability information whether use of the supported subscriber service by the end device requires an application to be operated by the end device;
    sending from the remote operations center the application to the end device when the application is required; and
    operating the application at the end device and using the supported subscriber service.

11. The method of claim 10 further comprising establishing at the remote operations center a rule set to govern use of the supported subscriber service by the end device.

12. The method of claim 11 further comprising:
    sending the rule set to the local gateway via the service provider network; and
    enforcing the rule set so as to permit the end device to use the supported subscriber service in accordance with the rule set.

13. The method of claim 10, wherein the service provider network is a cable network and the remote operations center is a headend.

14. The method of claim 10, wherein the subscriber network is selected from the group consisting of a wired network and a wireless network.

15. The method of claim 10, wherein the end device is selected from the group consisting of a computer, a personal digital assistant, a personal media assistant, a digital telephone, and a set top terminal.

16. The method of claim 10, wherein the services are selected from the group consisting of video streaming, video downloading, music streaming, music downloading, voice over IP, picture sharing, application sharing, video conferencing, video books and electronic print distribution, movie and program libraries distribution, online gaming, alerting services, and advanced remote device support.

17. The method of claim 10, wherein the rule set comprises one or more rules selected from the group consisting of a quality of service rule, a digital rights rule, a music rule, a video rule, a voice rule, an application rule, a time-of-day rule, a metered usage rule, a priority rule, and an authorization rule.

18. The method of claim 10 further comprising:

the remote operations center determining whether use of the supported subscriber service by the end device requires an application; and the remote operations center operating the application when the application is required.

19. A method for establishing a rule for an end device from a remote operations center comprising:

providing from an end device capability information to a local gateway, wherein the capability information is indicative of whether the end device is capable of performing the functions required to utilize a service provided by the service provider;

receiving at a datastore the capability information from the local gateway via a service provider network, wherein the datastore is accessible to a remote operations center;

accessing at the remote operations center the datastore;

using at the remote operations center the capability information to identify a subscriber service provided by the service provider for which the end device is functionally capable of performing (the supported subscriber service);

establishing at the remote operations center a service flow for the subscriber device, wherein the service flow establishes a quality-of-service level for provision of the supported subscriber service to the device; and configuring the local gateway to identify packets from the end device that are associated with the supported subscriber service and to place the identified packets on the service flow.

20. A system for establishing a rule for an end device from a remote operations center comprising:

an end device, wherein the end device is connected to the local gateway via a subscriber network, wherein the end device comprises capability information, wherein the capability information is indicative of whether the end device is capable of performing the functions required to utilize a service provided by the service provider, and wherein the end device is configured to provide the capability information to the local gateway; and a datastore accessible to a remote operations center, wherein the datastore receives the capability information from the local gateway, wherein the remote operations center is configured for:

accessing the datastore;

relating the capability information of the end-device to services provided by the service provider to identify a subscriber service provided by the service provider for which the end device is functionally capable of performing (the supported subscriber service);

establishing a service flow for the subscriber device, wherein the service flow establishes a quality-of-service level for provision of the supported subscriber service to the device; and wherein the local gateway is configured for:

identifying packets associated with the supported subscriber service; and placing the packets associated with the supported subscriber service on the service flow.

\* \* \* \* \*